July 8, 1969   F. H. BELL ET AL   3,454,329
REAR VIEW MIRROR ANTI-GLARE DEVICE
Filed Jan. 30, 1967
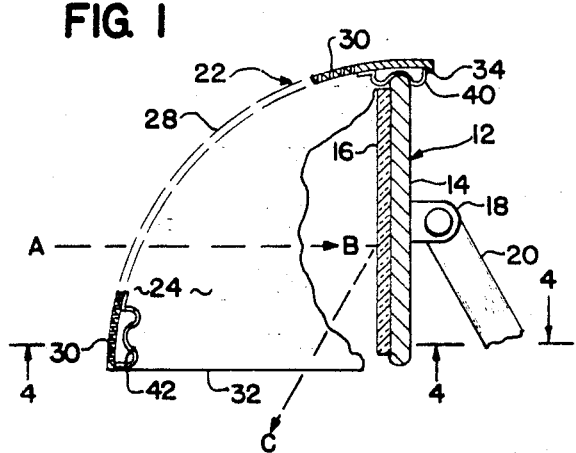
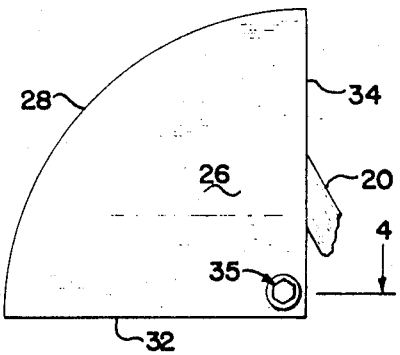
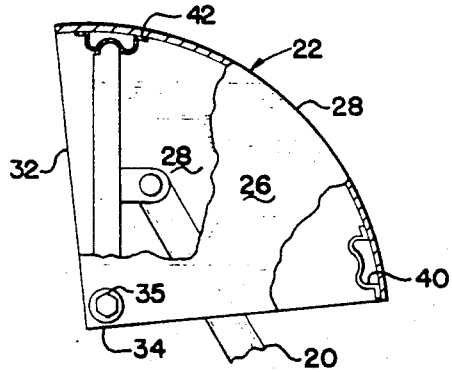
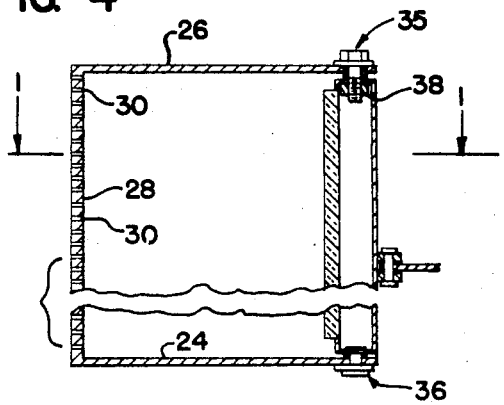
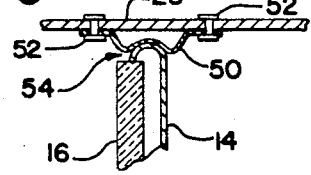
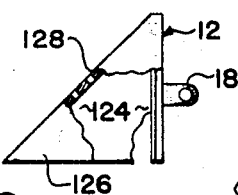
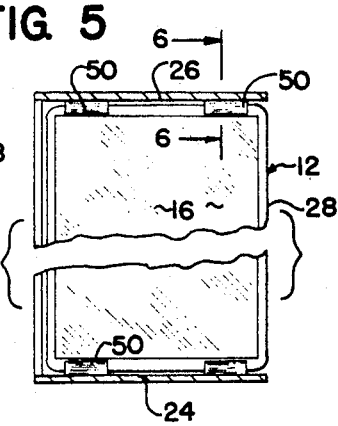
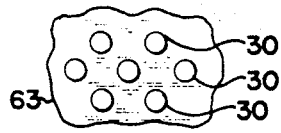
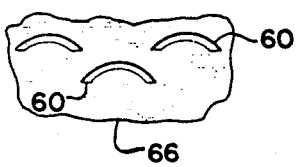
*INVENTOR.*
FRED H. BELL
HOUSTON E. KENNEDY
BY
MARCUS L. BATES United States Patent Office
3,454,329
Patented July 8, 1969

3,454,329
REAR VIEW MIRROR ANTI-GLARE DEVICE
Fred H. Bell, 4501 Redbud, and Houston E. Kennedy,
1605 E. 46th St., both of Odessa, Tex. 79760
Filed Jan. 30, 1967, Ser. No. 612,440
Int. Cl. G02b 17/00
U.S. Cl. 350—283                                    2 Claims

ABSTRACT OF THE DISCLOSURE

An anti-glare device attached to a vehicle body in interposed relationship between the lights of an overtaking vehicle and a rear view mirror wherein the intensity of the light normally reflected into the driver's eyes is reduced to a tolerable level of brilliancy. The device includes a perforated plate member mounted in a rotatable hood and having a multiplicity of small perforations therein that effectively lowers the intensity of light while leaving a clear field of vision.

BACKGROUND

This invention relates to a device that is used in conjunction with a rear view mirror of a vehicle which eliminates the dangerous glare that is reflected into a driver's eyes at night. When driving a vehicle at night, especially large trucks having external rear view mirrors mounted on either side of the vehicle, the glare from overtaking vehicles tends to blind the truck driver. This is especially so when the driver of the overtaking vehicle neglects to dim his lights whereby the light waves from the headlights of the overtaking vehicle directly impinges onto the rear view mirror and is reflected into the driver's eyes. The glare of the reflected light not only blinds the driver, but also causes him extreme physical discomfort after a few hours of night driving. In order to eliminate this dangerous condition, some truck drivers turn the rear view mirrors outwardly where light cannot possibly be reflected into their eyes. This simple expedient solves the problem of light reflection in the driver's eyes, but at the same time causes the more dangerous situation of being blind to rear traffic. Some drivers substitute a polarized and darkened mirror for the large rear view mirror. This is extremely dangerous, especially at night, since a polarized mirror fails to provide the driver with adequate depth perception. Furthermore, the inadequate size and possibly hurried installation of the auxiliary mirror leaves the driver with questionable protection from a safety viewpoint. Still other truck drivers will tie rags or other devices over the mirror in order to completely block off external light sources in a desperate attempt to eliminate this troublesome and dangerous problem. Some truck drivers go to other extremes in that they wear darkened sun shades at night in order to minimize the glare from the overtaking vehicles.

The problem of oncoming drivers failing to dim their vehicle lights is within the ability of the truck driver to satisfactorily minimize because he can force the oncoming driver to dim his lights by manipulating his own powerful headlight beams. As an added advantage and safety feature, modern technology has lessened the effect of undimmed oncoming headlights by providing the truck with a polarized windshield wherein the polarization is set at 45° opposite that of the polarized headlilghts of other vehicles, thereby greatly reducing the glare. As a last resort, the truck driver can always shield his eyes from the glare until the oncoming vehicle has safety passed.

SUMMARY

The present invention provides a diffusor plate which may be used in combination with the conventional rear view mirror in all automobiles or trucks by interposing the diffusor plate between the rear view mirror and the objectionable source of light whereby the objectionable source of light must pass through the diffusor plate, thereby eliminating the glare of the light. The remaining light that is reflected into the eyes of the driver is of a tolerable intensity, even when the headlights providing the objectionable glare are on high beam. The diffusor plate is preferably removably attached to the rear view mirror; or alternatively, may be swung into superimposed position with the mirror back plate whereby the diffusor plate may be stored during the daytime. The plate is rapidly positioned back into operative relationship with respect to the driver, mirror, and light source, when needed at night. The light diffusor plate is comprised of either a flat or curved perforated plate having apertures of any suitable configuration that attains the purpose of lowering the intensity of the objectionable light source.

It is therefore an object of this invention to provide a method by which the glare associated with night driving in conjunction with a rear view mirror may be reduced to tolerable limits.

Another object of this invention is to provide a method of reducing the intensity of reflected light sources by the provision of a light intercepting means that may be suitably interposed between the light source, the rear view mirror, and the eyes of a person.

Another object of this invention is to provide a new combination associated with a rear view mirror of a vehicle that includes a diffusor plate that may be interposed between the light source and the mirror to improve the safety of night driving.

Another purpose of this invention is the provision of a diffusor plate in combination with a rear view mirror and wherein the diffusor plate may be adjustably placed between the mirror and the light source.

The above objects and advantages of the present invention may be attained by the provision of a diffusor plate that includes a multiplicity of apertures therein that are suitably spaced apart to thereby permit only a portion of the light waves that are normally reflected by the mirror to reach a person's eyes.

BRIEF DESCRIPTION OF THE DRAWINGS

FIGURE 1 is a cross sectional view taken along line 1—1 of FIGURE 4, with some additional parts associated therewith being included for clarity;

FIGURE 2 is a top plan view of the device seen in FIGURE 1;

FIGURE 3 is a top plan view, showing the working relationship of the various elements of the combination that enable the method of the present invention to be practiced, with some parts being broken away to disclose the details hidden therewithin, and other parts being shown in section so as to better illustrate the details thereof;

FIGURE 4 is a cross sectional view taken along line 4—4 of FIGURE 1 or 2, with some parts being removed in order to conserve space;

FIGURE 5 is a longitudinal cross sectional view of a modification of the device seen in FIGURES 1 through 4;

FIGURE 6 is a cross sectional view taken along line 6—6 of FIGURE 5;

FIGURE 6A is a modification of the device seen in FIGURES 1 through 6;

FIGURE 7 is a fragmentary representation of part of the device seen in the foregoing figures;

FIGURE 8 is a fragmentary representation of part of a device that may be used in conjunction with FIGURES 1 through 6;

FIGURE 9 is a fragmentary representation of part of a device that may be used in conjuction with FIGURES 1 through 6.

DESCRIPTION OF THE PREFERRED EMBODIMENTS

Looking now to the details of the drawings, wherein there is disclosed the method of carrying out the present invention, there is seen generally indicated a preferred embodiment of the invention that includes a rear view mirror 12 having an enclosure or back plate 14 that rigidly retains a mirror 16 on the opposite face thereof. A bracket 18 is suitably mounted to a vehicle body by member 20. An arcuate longitudinally extending diffusor plate 22 having a lower rigid plate member 24 and a similar upper plate member 26 rigidly attached to the diffusor plate with the upper and lower plate members being held in spaced apart relationship thereto in a manner to suitably maintain the diffusor plate spaced apart from the mirror. The diffusor plate 28 is suitably apertured by a multiplicity of holes 30 that are one-sixteenth inch in diameter, and spaced apart on one-eighth inch centers with each line of holes being offset from the adjacent line of holes to thereby equally space each of the apertures 30 equidistant from one another. This configuration of holes will maintain the maximum strength of the diffusor plate. Edge portions 32 and 34 of each upper and lower plate member may be turned up or down 90° to thereby improve the rigidity of the device. Upper and lower pivotal members 35 and 36, respectively, in conjunction with lug 38, provide a journaled pivot point by which the assembly may be pivoted from the position of FIGURE 1 to the position of FIGURE 3, and vice versa.

Releasable latch assemblies 40 and 42 are suitably attached by riveting, spot welding, or the like to the diffusor plate and the reinforced edge portion of the device as illustrated in FIGURES 1 and 3. The latch is fabricated from a rectangular piece of sheet spring steel and made into a W configuration as illustrated in the drawings.

The embodiment of FIGURE 5 includes either the before-mentioned curved diffusor plate 22, or a flat diffusor plate as illustrated in FIGURE 6A. The upper and lower plate members 24 and 26 include spaced apart W-shaped releasable latch means 50 that are identical to the before-mentioned latch 40 or 42. The latches are suitably attached by rivets 52 to each plate member as seen at 26 for example. The latch means cooperates with an edge portion of the mirror, as illustrated by the arrow at 54 to thereby releasably attach the diffusor plate to the frame or backing plate of the mirror. Four spaced apart latches, disposed in the illustrated manner of FIGURE 5, are sufficient to releasably hold the assembly to a conventional mirror.

The embodiment of FIGURE 6A includes a flat upstanding diffusor plate 128 having upper and lower plate members 126 and 124, respectively, rigidly attached thereto by which the diffusor plate is held in properly spaced apart relationship with respect to the mirror 12. Plate members 124 and 126 may be extensions of the perforated or diffusor plate 128, or may alternatively be separate sheets that are attached to the upper and lower marginal edge portion of the diffusor plate by spot welding or the like. The diffusor plate of FIGURE 6A is preferably 0.040 sheet metal having five sixty-fourths inch diameter perforations spaced five sixty-fourths inch apart. The included angle between plate 128 and mirror 12 is between 45° and 75°, assuming the mirror 12 is an outside mirror located between 9 and 11 o'clock with respect to the driver.

As stated above, apertures 30 may be placed on any suitable material 63 with the apertures 30 preferably being staggered in the illustrated manner of FIGURE 7. Alternatively, arcuate slots 60 may be provided in a suitable member 66 and arranged in a staggered relationship with the arcuate slots being maintained in the illustrated manner of FIGURE 8. In lieu of slots or holes, it may be deemed desirable to employ extremely small squares 70 located in a plate 67 of a configuration as illustrated in FIGURE 9. It is further considered within the comprehension of this invention for the apertures to be in the form of diamonds, triangles, as well as any other geometrical design which will permit the plate member to maintain sufficient structural integrity when used in conjunction with the present invention.

OPERATION

The operation of the device illustrated in FIGURES 1 through 4 is illustrated in conjunction with a longitudinally extending rectangular mirror 12 such as a conventional outside rear view mirror associated with a large truck. When the apertured plate is rotatably positioned as illustrated in FIGURE 3, the assembly offers a streamlined frontal area to the wind, and accordingly the forces imposed upon the assembly is smaller than that on a box-like construction. At night, when the glare from overtaking vehicles begins to annoy the driver, the assembly may be grasped by one of its longitudinally extending edge portions and pulled into the operative position of FIGURES 1, 2, and 4, wherein the entire device has been rotated about the journaled pivotal points 35 and 36 from the position of FIGURE 3 to the position of FIGURE 1. Resilient latch means 40 maintains the device in the illustrated position of FIGURE 1 until it is again forced back into the before-described inoperative position of FIGURE 3. As seen in FIGURE 1, a light source A, such as provided by an overtaking vehicle, will penetrate the perforated plate 28 whereupon light waves from a light source will partially pass through the plate and impinge upon the surface of a mirror 16 as indicated at point B. The remaining light source will then be directed to the driver at C. The light source A will only partially penetrate the perforated plate 28 in accordance with the free area provided by the spaced apart apertures 30.

The limiting size of the apertures appears to be in accordance with Young's diffraction effect wherein light waves received from two adjacent holes overlap when the holes are closely spaced apart, thus causing interference. Accordingly, where the holes are exceedingly small in diameter, and closely spaced apart, the light waves from two adjacent holes that impinge upon the mirror may overlap and the visual observation of an object will then become unduly distorted. Where the holes are exceedingly large in diameter, excessive light waves are reflected by the mirror, and the maximum benefit of the invention is lost. Accordingly, one-sixteenth inch holes placed on one-eighth inch centers and aligned in rows with adjacent rows having the holes therein arranged in staggered relationship with respect to adjacent rows, enabling maximum structural integrity to be maintained by the screen, while at the same time the image of rearward objects remains in a satisfactorily undistorted condition. Perforations five sixty-fourths inch in diameter have also been found to be satisfactory when placed on five thirty-seconds inch centers, thus spacing adjacent holes five sixty-fourths inch apart as measured from the nearest adjacent peripheral surface of two adjacent holes.

It may be shown by others more skilled in the art that a certain amount of distortion in accordance with Young's diffraction effect is a desirable attribute; therefore, it is considered within the ability of the routine experimenter to establish optimum diameters of holes 30 that prove to differ from the five sixty-fourths inch diameter hole mentioned above.

When deemed desirable, and especially in order to use the invention in conjunction with previously fabricated or presently commercially available mirrors, the pivotal attachment means 35 and 36 may be dispensed with by relocating the releasable resilient clamp 40 and 42 in the prescribed manner taught by FIGURES 5 and 6. As seen in FIGURES 5 and 6, the releasable resilient latch 50 may be suitably attached to the upper and lower plate members 24 and 26 whereby the detent in the releasable and resilient latch 50 engages the outer marginal edge portion of a mirror frame as best seen in FIGURES 5 and 6.

Accordingly, the present invention provides a new and useful apparatus that improves driver comfort and safety for night-time driving in a manner that has not heretofore been known. When the apparatus disclosed herein is used in accordance with the teachings of this invention, a new method related to anti-glare devices is necessarily taught.

It will occur to others, having now read our disclosure, to interpose the preferred diffusor plate so as to intercept the light waves between the driver and the mirror, rather than between the light source and mirror in the illustrated manner set forth in the drawings. This arrangement of driver, diffusor plate, and mirror is inferior to the present arrangement of the invention since the intensity of light within the vehicle, as compared to the intensity of light at the mirror, is generally of a greater magnitude and accordingly, the image of rearwardly located objects is difficult to distinguish. This concept would be beneficial in conjunction with a pair of eyeglasses wherein the diffusor plate is maintained adjacent the eyeglasses. In such an arrangement, the eyeglasses form a darkened chamber and since the eyes are located within the chamber, visual observation of external images are possible under conditions of reduced glare.

It will further occur to others to install the diffusor plate either adjacent the rear window glass or between the laminations of the rear window glass. Such a concept is deemed to fall within the comprehension of this invention.

Accordingly, while we have shown and described several specific embodiments of our invention, the means by which the present method can be practiced is not to be construed as being limited to the foregoing disclosure, but rather is to be considered only in light of the appended claims. Therefore, what we deem to be the metes and bounds of our intellectual property is set forth in the following claims.

We claim:

1. In combination with an outside rear view mirror that is suitably attached to the body of a vehicle, wherein a driver seated inside the vehicle can visually observe light waves originating from a source located in a rearward direction and impinging upon the mirror, the improvement comprising:
   a diffusor plate interposed between the reflective surface of the mirror and the source of light waves;
   journal means pivotally attaching said diffusor plate to said vehicle to thereby maintain the diffusor plate spaced apart from said mirror to enable the driver to visually observe light that penetrates the diffusor plate and is then reflected by the mirror;
   said diffusor plate being perforated with a multiplicity of spaced apart circular holes;
   said holes being of a sufficient size to permit adjacent light waves from adjacent holes to pass therethrough and to the driver in substantially uninterfering condition with respect to each other;
   said diffusor plate being fabricated from a rectangular sheet of self-supporting material and having a top, bottom and side edges and bent into a curve;
   an upper plate member, a lower plate member, said upper and lower plate members each having a first edge portion, a second edge portion, and a remaining edge portion interconnecting the first and second recited edge portions;
   said upper ad lower plate members being spaced apart from each other and having said remaining edge portions each rigidly attached to said top and bottom edge portion of said perforated plate member, with the said remaining edge portion defining the curvature of said perforated plate member;
   resilient latch means oppositely disposed with respect to said journal means and attached near said top and bottom of said perforated member and adapted to cooperate with said mirror in order to removably affix the position of the diffusor plate to the mirror;
   whereby said diffusor can be moved into an operative position for night-time driving and moved into an inoperative position for daylight driving, said journal means being located between said upper and lower rigid plate member, respectively, and the mirror;
   said resilient latch means including a releasable latch assembly adjacent each edge portion, one of said releasable latch assemblies adapted to engage an edge portion of the mirror when said diffusor plate is in the operative position, the remaining releasable latch assembly adapted to engage the edge portion of the mirror when said diffusor plate is in the retracted position;
   whereby said diffusor plate is rotatable from an operative to an inoperative position to enable the diffusor plate to be retracted free of the mirror for daytime driving.

2. The improvement of claim 1 wherein said multiplicity of spaced apart apertures are each about one-sixteenth inch in diameter with the outer peripheral surface of each aperture being spaced apart from the outer peripheral surface of the next adjacent aperture by about one thirty-second inch.

References Cited

UNITED STATES PATENTS

| | | | |
|---|---|---|---|
| 1,781,557 | 11/1930 | Reukauf | 350—283 |
| 1,905,868 | 4/1933 | Hein | 350—283 |
| 1,990,222 | 3/1935 | Burlein | 350—283 |
| 2,045,751 | 6/1936 | Burlein | 350—283 |
| 2,442,504 | 6/1948 | Miller | 350—268 |
| 2,882,792 | 4/1959 | Levine | 350—266 |
| 3,133,139 | 5/1964 | Beers | 350—283 |
| 3,199,114 | 8/1965 | Malifaud | 351—45 |

DAVID SCHONBERG, *Primary Examiner.*

PAUL R. GILLIAM, *Assistant Examiner.*

U.S. Cl. X.R.

350—65